United States Patent
Lin et al.

(10) Patent No.: US 8,040,461 B2
(45) Date of Patent: Oct. 18, 2011

(54) COMPOUND DIFFUSION PLATE STRUCTURE, BACKLIGHT MODULE, AND LIQUID CRYSTAL DISPLAY

(75) Inventors: Chao-Ying Lin, Jhonghe (TW); Ying Yuan Wu, Pingjhen (TW); Chun-Yu Lin, Pingjhen (TW); Jen-Huai Chang, Pingjhen (TW); Chung Yu Chen, Bade (TW)

(73) Assignee: Entire Technology Co., Ltd., Taoyuan County (TW)

( * ) Notice: Subject to any disclaimer, the term of this patent is extended or adjusted under 35 U.S.C. 154(b) by 196 days.

(21) Appl. No.: 12/588,313

(22) Filed: Oct. 13, 2009

(65) Prior Publication Data

US 2011/0085110 A1    Apr. 14, 2011

(51) Int. Cl.
G02F 1/1335    (2006.01)
(52) U.S. Cl. ............... 349/64; 349/56; 349/61; 349/62; 349/63
(58) Field of Classification Search .................... 349/56, 349/61, 62, 63, 64
See application file for complete search history.

(56) References Cited

U.S. PATENT DOCUMENTS

| 6,807,005 | B2 * | 10/2004 | Honda et al. | 359/485.03 |
| 7,217,004 | B2 * | 5/2007 | Park et al. | 362/240 |
| 7,658,502 | B2 * | 2/2010 | Moon et al. | 362/97.2 |

* cited by examiner

*Primary Examiner* — Jennifer Doan
(74) *Attorney, Agent, or Firm* — Rosenberg, Klein & Lee (57) ABSTRACT

A liquid crystal display, comprising: a liquid crystal display panel and a backlight module. The backlight module comprising: a reflection unit, a light emitting unit, and a compound diffusion plate structure. The light emitting unit has a plurality of light emitting components installed within the installation space of the reflection unit. The compound diffusion plate structure is placed on one side of the light emitting unit, comprising: a body unit and a printing micro diffusion unit. The body unit has a main layer, and a plurality of micro diffusion particles formed inside the body unit, allowing light to diffuse within the body unit. The printing micro diffusion unit has a plurality of convex lens units formed on a light entrance plane or a light exit plane of the body unit by means of printing.

7 Claims, 8 Drawing Sheets

COMPOUND DIFFUSION PLATE STRUCTURE, BACKLIGHT MODULE, AND LIQUID CRYSTAL DISPLAY

BACKGROUND OF THE INVENTION

1. Field of the Invention

The present invention is related to a compound diffusion plate structure, backlight module, and liquid crystal display; in particular, to a compound diffusion plate structure capable of increasing brightness and range of angle of view, as well as a backlight module and a liquid crystal display using the compound diffusion plate structure.

2. Description of Related Art

Since the demand on the size of backlight module keeps increasing, conventional small to middle size backlight modules of side-light type have been gradually substituted by direct-light type backlight modules. In a backlight module of side-light type, light enters on one side of light guiding plate, and repeatedly reflects and diffuses inside the light guiding plate based on the total reflection principle in order to enhance the light range and uniformity; afterward, the total reflection is broken by an optically designed micro structure to uniformly emit light out of the light guiding plate, light is then diffused through a diffusion film, and concentrated via an enhancing film to a positive angle of view, then after reflection, providing the required light for the light crystal panel, which does not generate light in itself for image display operations. Since the lamps used in the side-light module are hidden on the side of the light guiding plate and covered by masks, human eye will not directly see these lamps, thus uniformity thereof can be conveniently controlled by the design of the light guiding plate; wherein, the lamps are restricted to the thickness of the light guiding plate, so brightness is usually insufficient, thus enhancing film is needed to increase brightness. However, in general cases, due to the shrinkage of angle of view caused by using the concentrating plate, the final angle of view may not be suitable for multiple viewers to see at the same time. In terms of the direct-light type backlight module applied in current LCD-TV's, as the required size becomes larger, the requirements on injection smoothness in large-sized light guiding plate and tonnage of the injection machines make it more and more difficult to successfully achieve the necessary manufacturing processes for direct-light type backlight module, and the overall weight of the product becomes much heavier; therefore, it is common to see side-light light guiding plate with insufficient brightness used in large-size televisions because the manufacturing process difficulty and cost of direct-light type backlight module is much higher; furthermore, the larger the surface area is, the greater the demand for brightness or luminosity becomes, which means the number of lamps needed increases accordingly, and because the side-light light guiding plate with the side-light type space limitation problem can not accommodate more lamps therein, thus it is incapable of meeting the requirements on large surface and high brightness in present television market. It should be noted that large size liquid crystal televisions no longer use the backlight module of side-light type which requires light guiding plate, but employ direct-light type backlight module of multiple lamps to fulfill the demand for televisions with high brightness and wide angle of view features.

The backlight module, in essence, provides the liquid crystal panel with a light source of uniformity and high brightness, whose basic principle is that it converts a common, similar point-wise or linear light source into a planar light source product with high luminosity and uniform brightness through a terse and effective optical mechanism. The optical design of a general side-light type structure uses a linear light source from a Cold Cathode Fluorescent Lamp in which the emitted light passes through a reflection mask and enters into the light guiding plate, converted from linear light source distribution into a uniform planar light source, then made to subject to the light equalization performed by a diffusion plate and light concentration performed by a prism sheet, in order to enhance the brightness and uniformity in the light source.

In general, light passes through a diffusion plate after emitting from a light source, with poorer orientation in the light emitted from the diffusion plate; therefore, it is necessary to use a prism sheet to correct the direction of light which applies the geometric structure in its design to allow light to refract and totally reflect to achieve the objectives of light concentration and frontal brightness enhancement. However, the effect of brightness increase in the backlight achieved by the above method is merely based on the light convergence from a wider angle of view to a narrower one; consequently the angle of view shrinks, causing a problem of reduced angle range of view when watching the display, so that the user can only view with a limited angle range of view or otherwise it is impossible to clearly see the images shown on the screen of the display, resulting in inconvenience for users to a certain extent. As such, currently there also provides a novel Dual Brightness Enhancement Film (DBEF), which applies the principle of multi-film interference, to achieve the design of brightness enhancement on total angle of view without compressing angle of view. For the liquid crystal television using the direct-light type backlight module, since the plurality of lamps in the backlight module are directly places in the lamp box of the backlight module, light emitted from the lamp will be directly seen by human eyes; so, suppose simply placing the lamp into the box without the design of light equalization, it can not be used as a backlight source since this may cause poor uniformity in the backlight module and brightness variation may occur, resulting in so-called un-even lamp image and lamp phenomenon (referred as MURA problem in Japan). The condition occurring in the lamp source of the direct-light type backlight module is rather analogous to when people directly look at a fluorescent light: the place where people see the fluorescent light tube is most bright, but the brightness in the dark zone between light tubes decrease dramatically. Therefore, the direct-light type backlight module needs a diffusion plate and multiple diffusion films, or even micro structure diffusion films, to mask or diffuse lamp images so as to achieve the purpose of uniform backlight source. Only by this uniform backlight module can the uneven effect in the liquid crystal image display be avoided. The compound diffusion plate according to the present invention can reduce or eliminate the MURA problem, thus providing required uniform illumination for future use in various backlight modules, advertisement light boxes, lighting devices, road lamps, and etc.

Accordingly, having noticed the above-discussed improvable defects and utilized solid long-term relevant experiences in practical operations, together with prudent and insightful observations and researches, in conjunction with, theoretical applications as well, the inventors of the application herein propose the present invention to offer reasonable design for being able to effectively amend the aforementioned defects.

SUMMARY OF THE INVENTION

The present invention provides a compound diffusion plate structure having high brightness and wide range of angle of view, and a backlight module and liquid crystal display using the said compound diffusion plate structure, which is essentially addressed to: under the premises of environmental protection for reduction in power consumption (less lamps) and minimization in thickness of backlight module (lighter and thinner), the brightness in light source of backlight module can be maintained and light diffusion can be enhanced, so as to further provide the liquid crystal display with better brightness uniformity and wider angle of view. In other word, the present invention is capable of easing or eliminating the MURA problem in the situation of having less number of lamps and reduced thickness of backlight module.

A solution according to the present invention provides a compound diffusion plate structure having a light-emitting unit generating a first optical path and a second optical path, including: a body unit, a plurality of convex lens units, and a micro structure lens diffusion unit. The body unit has a light entrance plane and a light exit plane. The convex lens units have a plurality of first structures and second structures. The first structures and the second structures are arranged on the light entrance plane, the first structures are adjacent to each other, every two second structures are separated from each other by a predetermined gap, and the first structures correspond to the light-emitting unit. The micro structure lens diffusion unit is arranged on the light exit plane. In addition, when one part of the first optical path passes through the first structures, the one part of the first optical path is refracted by the first structures and the body unit and is transmitted to the micro structure lens diffusion unit to generate divergence. When the second optical path passes through the second structures, the second optical path is refracted by the second structures and the body unit and is transmitted to the micro structure lens diffusion unit to generate divergence.

A solution according to the present invention provides a backlight module, including: a reflection unit, a light emitting unit and a compound diffusion plate structure. The reflection unit has a reflection plate, an installation space formed by the surrounding reflection plate, and a reflection coating formed on the internal surface of the reflection plate. The light emitting unit has a plurality of light emitting components installed within the installation space, and light-emitting unit generates a first optical path and a second optical path. The compound diffusion plate structure is installed beside the light emitting unit, and the compound diffusion plate structure includes a body unit, a plurality of convex lens units, and a micro structure lens diffusion unit.

A solution according to the present invention provides a liquid crystal display, including: a liquid crystal display panel, a backlight module and a compound diffusion plate structure. The backlight module is installed under the liquid crystal display panel to provide the required light source for the liquid crystal display panel, and the backlight module includes a reflection unit and a light emitting unit. The reflection unit consists of a reflection plate, an installation space formed by the surrounding reflection plate, and a reflection coating formed on the internal surface of the reflection plate. The light emitting unit has a plurality of light emitting components installed within the installation space, and light-emitting unit generates a first optical path and a second optical path. The compound diffusion plate structure is installed beside the light emitting unit, and the compound diffusion plate structure includes a body unit, a plurality of convex lens units, and a micro structure lens diffusion unit.

In order to facilitate better understanding of the technologies, means, and effects taken by the present invention to achieve the prescribed objectives above, references are made to the following detailed descriptions and appended drawings relevant to the present invention. It is believed that the purposes, characteristics, and features of the present invention can be thereby profoundly and concretely appreciated. However, the appended drawings are simply of reference and illustration purposes, without any intention to limit the present invention thereto.

DETAILED DESCRIPTION OF THE PREFERRED EMBODIMENTS

Figure 1A:
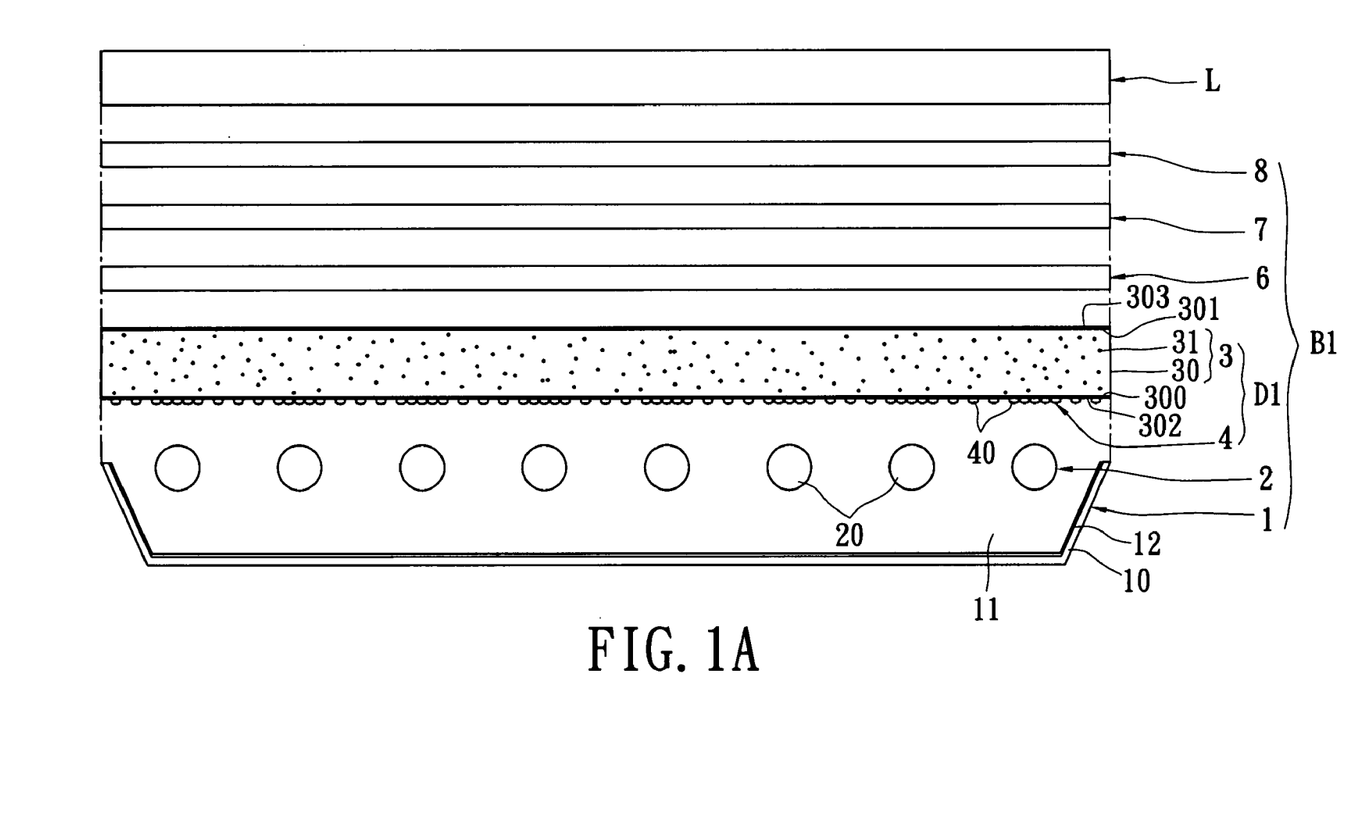
FIG. 1A shows a side view disassembly diagram for a first embodiment of the liquid crystal display according to the present invention.
Figure 1B:
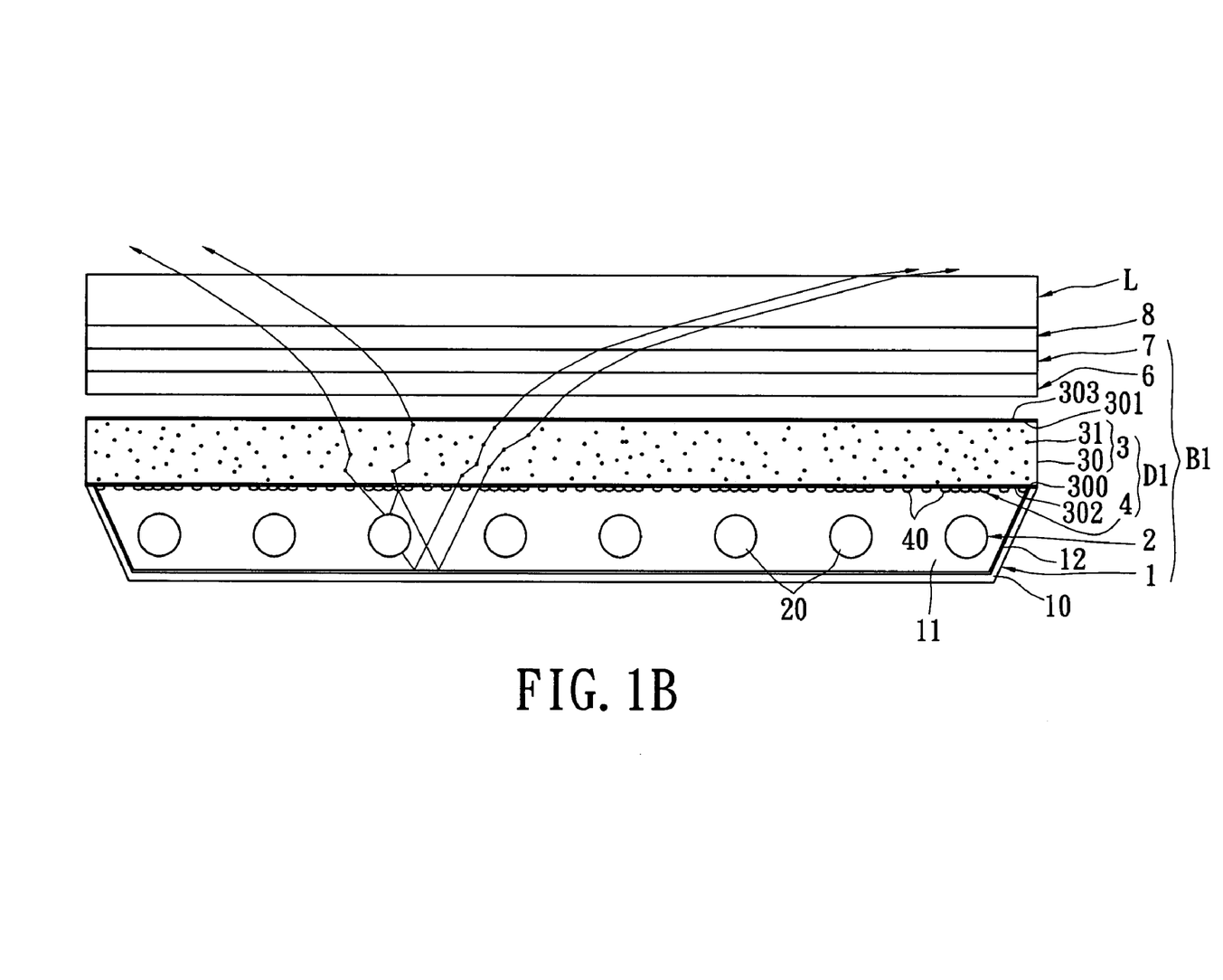
FIG. 1B shows a side view assembly diagram for the first embodiment of the liquid crystal display according to the present invention.

Refer now to FIGS. 1A and 1B, as shown therein, a first embodiment of the present invention provides a liquid crystal display, comprising: a liquid crystal display panel L and a backlight module B1, and the backlight module B1 is installed under the liquid crystal display panel L, offering required light source for the liquid crystal display panel L. Additionally, the backlight module B1 consists of: a reflection unit 1, a light emitting unit 2, and a compound diffusion plate structure D1; as well as a first diffusion film 6, a second diffusion film 7 and a third diffusion film 8 sequentially installed over the compound diffusion plate structure D1.

The reflection unit 1 has a reflection plate 10, an installation space 11 formed by the surrounding reflection plate 10, and a reflection coating 12 formed on the internal surface of the reflection plate 10, wherein the reflection coating 12 is usually formed by a film of high reflectivity feature, commonly attached onto the reflection plate 10; however, other design of applying the paint material of high reflectivity directly onto the reflection plate 10 may be applied as well. The reflection plate 10 may present a cup-shaped semi-open structure, or else with any other desired shapes, and is mostly composed of machine-punched iron or other light metals. Furthermore, the reflection coating 12 may be a white paint coating or a silver paint coating, in which the silver paint coating mostly consists of vapor coated aluminum or silver with the feature of high reflectivity, satisfying the requirement on high brightness, but of poor diffusion and scatting capabilities due to its similarity to a mirror; whereas the white paint coating are mostly used for scattering purpose, which diffuses light more uniformly. The white paint coating is generally formed by films containing high density diffusion particles or foamed therein, whose operational principle is that it uses the difference in refraction index to enable high level light scattering and reflection so as to achieve uniform scattering and reflection.

In addition, the light emitting unit 2 has a plurality of light emitting components 20 installed inside the installation space 11, and based on various demands, the said plurality of light emitting components 20 may be a plurality of Cold Cathode Fluorescent Lamps (CCFLs), a plurality of Light Emitting Diodes (LEDs), Heat Cathode Fluorescent Lamps (HCFLs), or any other types of light emitting components. Besides, it can be seen from FIG. 1B that the light projected from these light emitting components 20 can be directly projected upward, or else first transferred through the reflection and scattering on the reflection coating 12 then projected upward, in which the above-mentioned white paint coating can be used to generate higher uniformity in the reflected light and the silver paint coating thus generate higher brightness therein.

Besides, the compound diffusion plate structure D1 is installed over the light emitting unit 2, wherein the compound diffusion plate structure D1 comprises: a body unit 3 and a printing micro diffusion unit 4. Herein the body unit 3 has a main layer 30 and a plurality of micro diffusion particles 31 formed within the main layer 30. The said particles are generally of material and refraction index thereof differs from the body 30, in which the larger the difference in refraction index is, the higher the capability for diffusion thereof can become. The shape of the micro diffusion particles 31 is commonly spherical; whereas bar shape, ellipse shape or other specific shapes, or else in combination of various diffusion particles with different sizes or shapes or refraction index, are also applicable. The shape, size, refraction index, and distribution density of the diffusion particles may affect the diffusion capability and penetration rate in the diffusion plate. Also, the upper surface and lower surface of the main layer 30 may be further installed with a sub-layer (300, 301) co-extruded with the main layer, and such a sub-layer is commonly designed based on process demands. Generally speaking, the thickness of the sub-layer is less than the main layer, in which the thickness of the sub-layer (300, 301) is about 5%~30% of the thickness in the main layer 30. If co-extrusion process is used, then it is possible to fabricate a diffusion plate with more sub-layers 300, 301. Usually, it is also possible to adopt a design of no sub-layer 300, 301, which fabricates a diffusion plate with only the main layer 30. Regarding to the above-said co-extrusion process, the sub-layer 300, 301 can be doped with certain ultra-violet (UV) light absorbents to absorb most of the UV light, in order to prevent liquid crystal from damage or deterioration caused by long-term illumination of UV light emitted from the lamps. In general, the sub-layers 300 and 301 may be doped with some extra functional auxiliary additives therein, e.g. anti-UV agents, fluorescent whitener, anti-electrostatic agents and the like. There are designs in which the micro diffusion particles 31 can be added in the sub-layers 300 and 301, or alternatively, the micro diffusion particles 31 not added in the main layer 30 but only in the sub-layers 300 and 301; that is, the micro diffusion particles 31 can be added into the main layer 30 and into the sub-layers 300 and 301 as well. Suppose, in terms of single-layer extrusion process, since no sub-layer 300, 301 is installed on the upper and lower surfaces of the main layer 30, at this moment the UV absorbents or the micro diffusion particles 31 are added only in the main layer 30, then the light entrance plane 302 or the light exit plane 303 is directly and respectively placed onto the lower and upper surface of the main layer 30.

Furthermore, if the diffusion plate is installed with the sub-layers 300, 301 respectively on the lower and upper sides of the main layer 30, then the light entrance plane 302 and the light exit plane 303 will be respectively placed on two lateral surfaces of the sub-layers 300, 301. Contrarily, in case that the diffusion plate is not installed with the sub-layers 300, 301, then the light entrance plane 302 and the light exit plane 303 will respectively be placed on the lower and upper surfaces of the main layer 30. The micro structure lens 50 and the printing micro lenticular diffusion dots 40 of the present invention are installed on the light entrance plane 302 and the light exit plane 303. The materials for the main layer 30 and for the sub-layers 300, 301 can be selected from the following group consisting of: Polycarbonate (PC), Polymethylmethacrylate (PMMA), Polystyrene (PS), Methylmethacrylate Styrenre (MS), or Polypropylene (PP); or various selections of macromolecular polymer thermoplastic materials or a combination thereof in accordance with a specific ratio. However, the aforementioned materials are simply for illustrative purpose, but not being used to limit the present invention thereto.

Additionally, the micro diffusion particles 31 are added in the main layer 30 or in the sub-layers 300, 301 according to a ratio from 0.001% to 50%, and the difference between the refraction index of the micro diffusion particles 31 in any direction and the refraction index of the main layer 30 is in a range of ±0.02~±0.5. In general, the larger the difference in refraction index is, the higher the diffusion feature can become. For the novel surface micro structure-typed diffusion plate with high penetration rate feature, in order to maintain its high penetration rate feature, usually only a small amount of micro diffusion particles 31 are added in the main layer 30 or the sub-lays 300, 301 inside the body unit 3. Furthermore, the micro diffusion particles 31 can be made of Polymethylmethacrylate (PMMA), Polycarbonate (PC), Polystyrene (PS) or Polypropylene (PP) or Silica (SiO$_2$), Methylmethacrylate Styrenre (MS), Silica, or other combined macromolecular polymers; also, the particle diameter of the micro diffusion particles 31 is between 0.1 to 30 micrometers (μm). According to Mie's scattering theory, changes in particle size of the micro diffusion particles 31 will affect scattering type and scattering distribution angle. However, the aforementioned materials for the micro diffusion particles 31 are only exemplary, not being used to limit the present invention thereto.

Besides, the printing micro diffusion unit 4 has a plurality of convex lens units 40 formed on the light entrance plane 302 of the body unit 3 by way of printing, and the upper surface of printing micro diffusion dot 40 can be of aspheric surface or composed of curved phase with minor bump or recess relief The design of size or density distribution in the convex lens units 40 can be of distribution type formed by many basic round, square, or polygon units, or a combination of various shapes in a specific ratio. The dots on the diffusion plate surface of the embodiment according to the present invention are mainly made by way of screen printing; while in terms of practical screen printing, during the screen printing process, the size of the convex lens units 40 may slightly vary depending on the size, density of mesh used in the screen printing; at the same time, factors such as the process of screen printing, viscosity of print ink material will have influences on the produced shapes and final optical properties as well. In general, the size range of the convex lens units 40 can be 10 mm~6 mm. The size and precision of the convex lens units 40 are limited by the size of meshes in the screen printing; for more stable screen printing, it is preferred to have a dot size of 60 μm~1 mm. The height distribution of the convex lens units 40 is about 2 μm~30 mm. Preferred printing height is about 4 μm~180 μm for better control. Such a height is limited by the ink viscosity, amount of used ink, scraper pressure, scraper speed, scraper hardness, screen mesh, screen material, screen thickness, and mechanical parameters used in printing machines. The major composition of convex lens units 40 can be classified into resin mixture and diffusion particles, such as silica, titanium oxide, barium sulfate, dilutors, auxiliary additives etc. Process methods in general fabrication may change based on different type of inks, in which the diffusion feature of the dots can be modified by altering the ratio of added diffusion particles. During a general printing process, the designed convex lens units 40 will first be subject to drying or curing operations via heat or UV light application in order to be formed on the surface of the diffusion plate; that is, the convex lens units 40 can be placed on the light entrance plane 302 (i.e. lower surface) or the light exit plane 303 (i.e. upper surface) of the body unit 3 as desire. In case higher diffusion capability is needed, it is possible to place the convex lens units 40 on both of the light entrance plane 302 and the light exit plane 303.

In addition, the convex lens units 40 over the light emitting components 20 are more closely arranged, while the convex lens units 40 over the light emitting components 20 but near one side present less arrangement density. Such a feature can be adjusted based on overall mechanism design and film/sheet configuration. Still, the diffusion dots 40 may present other non-monotone increasing or non-monotone decreasing distributions in terms of size or density as well. The distributions and sizes may vary from large to small then to large, or alternatively from tiny to big then back to tiny. All these depend on the film configuration, pitch between lamps in the backlight module, thickness in the module, and bidirectional scattering distribution function (BSDF) feature of the reflection plate, wherein the size of the convex lens units 40 and difference of interval density can be designed and analyzed for adjustment by optical simulation, or empirically tested by users for step-wise modifications and fine tuning on meshes. In regard to general design architecture, a portion of the convex lens units 40 are close to the light emitting components 20, while the rest of them may far from the light emitting components 20, and those light emitting components 20 in proximity of the light emitting components 20 present higher density than those light emitting components 20 located more remote from the light emitting components 20. Certainly, in addition to such an adjustment on density distribution, it may be also designed as varying the diameters of the convex lens units 40 based on the positions of the lamps. The alternations on density and size of the convex lens units 40 are possible means for optical design modification.

Furthermore, based on practical demand in design, the above-said first diffusion film 6, second diffusion film 7, and third diffusion film 8 sequentially installed on the compound diffusion plate structure D1 may be alternatively modifies as "a first diffusion film, a second diffusion film, and a Dual Brightness Enhancement Film (DBEF)" or else "a first diffusion film, a second diffusion film, and a Brightness Enhancement Film (BEF)". Of course, according to various needs, it is possible to increase or reduce the numbers of the diffusion films, DBEFs, BEFs, or other novel micro structure optical films. In view of current design trend for cost reduction, slimness and energy saving, it is desirable to reduce the number of used films as much as possible, thus there also provides a type of backlight design which applies only two lower diffusion films; however, it should be appreciated that simply and directly reducing the number of films may make the problems of lamp MURA and lack of uniformity in brightness more serious, while the design of the present invention can achieve both objectives of reduction in number of used films and easing or eliminating the MURA problems.

Therefore, from the arrow shown in FIG. 1B, it can be seen that through the combination of the reflection coating 12, the convex lens units 40 and the micro diffusion particles 31, it allows the light created by the light emitting components 20 to generate scattering, thus further enhancing the diffusion and uniformity in the through the light exit plane 303. In particular, by means of the convex lens units 40 formed on the light entrance plane 302 of the main layer 30, the present invention diffuses for equalization the intensive, directly illuminating light emitted from the light emitting components 20, such that the light generated by the light emitting components 20 forms scattering reflections; that is, the luminosity in the brighter areas above the light emitting components 20 is reduced, and, at this moment such light can be reflected into darker areas between two lamps because of the installation of the convex lens units 40, and in this way, luminosity in originally darker areas on the sides of the light emitting components 20 can thus be significantly increased. Such an effect of scattering intensive light in brighter areas over the lamp and reflecting the scattered light onto the darker areas between two lamps can ease out the differences in brightness and darkness, which is the major principle for reducing MURA problem. As such, to thoroughly resolve this issue, the present invention employs the convex lens units 40 as the first correcting means to effectively enhance light diffusion and uniformity, thus further providing the liquid crystal display with better positive brightness and wider angle of view. The reason is, if light has been through once a course for uniformity in the scattering reflection by the convex lens units 40 before entering into the diffusion plate, light uniformity in overall backlight module can be significantly enhanced. The present invention uses sizes, shapes, thickness, and density distributions of the convex lens units 40 to perform fine tuning on the light entering into the diffusion plate, since such a correcting means has already lowered the brightness over the lamp and also intensified the brightness on darker areas between two lamps, MURA difference in luminosity may have been largely reduced. It can be seen that the main function of the convex lens units 40 is to adjust the uniformity in distribution locations of light before it enters into the main layer 30 and the sub-layers 300, 301. Conventional direct-light diffusion plate designs in prior art mostly adopted the approaches of diffusion particles addition in diffusion plate or micro structure diffusion plate with micro structure on the surface thereof. Prior art, without provision of such convex lens units 40, can not adjust the uniformity of light distribution locations before light from light source enters into the diffusion plate, but rather simply depending on such micro structures to modify the direction of light, which is not able to significantly alter the light distribution locations. Using the conventional diffusion plate may cause, from very beginning, light to appear on top of the lamp to be strong and bright, however light remains dim and weak on darker areas between two lamps, thus MURA issue would be more pronounced and serious. This is the essential difference between the diffusion plate according to the present invention and a conventional one. If the convex lens units 40 are installed on the light exit plane 303, then effect of scatting and softening on strong light emitted from lamps can still be achieved, but, due to difference in light path and traveling course, in general the diffusion feature may be lower than the one obtained by being installed on the light entrance plane; however, such a design of allowing the convex lens units 40 to be placed on the light entrance plane or on the light exit plane provides flexible use in conjunction with designs of future lamp box or backlight module mechanism. Novel thinner or lamp-reduced energy saving backlight modules take mechanism size and supportive hardness into considerations; the thickness of diffusion plate used in general TV's is about 0.7~3 mm, preferably about 1.5~2.0 mm, while to uniformly diffuse light emitted from a CCFL lamp or LED within such a thin backlight cavity thickness being difficult, as a result, conventional diffusion plates increased thickness of diffusion plate to extend times and optical paths for light diffusion; however, at this time, by simply increasing thickness or reducing penetration rate in the diffusion plate, amount of excessively added diffusion particles may reach a saturation condition, thus final brightness in the backlight module largely decreases, which is not only unable to resolve MURA problem, but excessively adding diffusion particles and thickness of plate materials may eventually cause unnecessary increases in costs, weight, thickness, posing major problems found in conventional diffusion plates by simply doping diffusion particles. Contrarily, in novel micro structure diffusion plate, in addition to distribute diffusion particles, there also install micro structures on the upper and lower surfaces of the diffusion plate, such as lenticular lens, aspheric lens, prisms; whereas such micro structure diffusion plates may tend to present a problem of uneven angle of view due to light concentration and significant light refraction in the structure. The present invention uses the convex lens units 40 of thickness about 2~30 mm, so problems in increments of diffusion plate thickness and weight can be avoided, relieving the problem of uneven angle of view caused by surface micro structures, greatly strengthening diffusion capability in the diffusion plate, thus enhancing free space for design of thinner and lamp-reduced energy saving backlight modules.

Figure 2A:
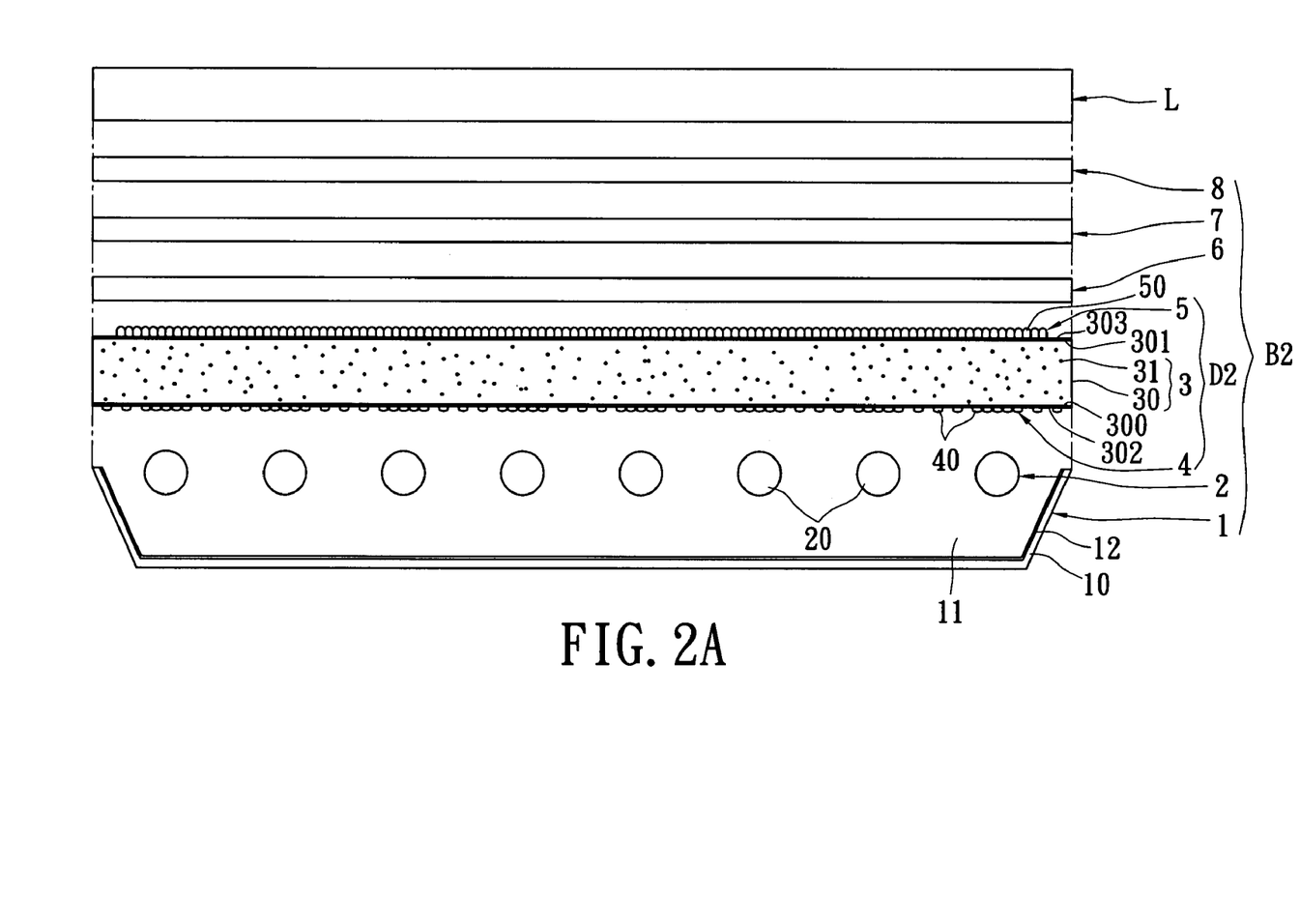
FIG. 2A shows a side view disassembly diagram for a second embodiment of the liquid crystal display according to the present invention.
Figure 2B:
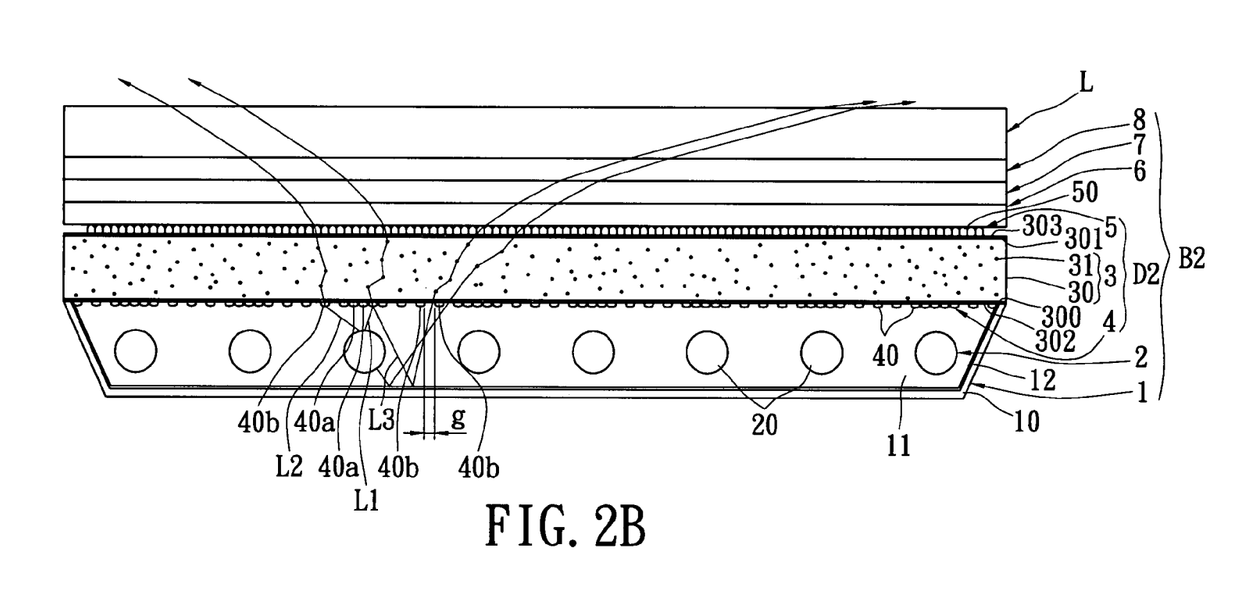
FIG. 2B shows a side view assembly diagram for the second embodiment of the liquid crystal display according to the present invention.

Refer now to FIGS. 2A and 2B, wherein, as shown, the major difference between the first embodiment and the second one is in that, a compound diffusion plate structure D2 further comprising: a micro structure lens diffusion unit 5, having a plurality of micro structure lens 50 formed on the light exit plane 303 of the sub-layer 301, which the plurality of micro structure lens 50, based on the use of different light sources, may be also modified from a one dimensional cylindrical lens structure to a lenticular structure of two dimensional matrix arrangement. If the said plurality of micro structure lens 50 is arranged in a one dimensional cylindrical lens, they are more suitable for acting as linear light sources for current direct-ling backlight modules, e.g. CCFL, HCFL etc.; otherwise, if they are configured in a two dimensional lens matrix, it is preferable to be used as point-wise light sources such as Light Emitting Diodes (LEDs). Regarding to the second embodiment of the present invention, the cross-section profile for the micro structure of the plurality of micro structure lens 50 is about 100 μm in height with a semi-circle perimeter of about 200 μm, which semi-circle perimeter extends along a certain direction and forms the cylindrical lens. In general, such type of cylindrical lens micro structure can be fabricated by using a diamond blade in a CNC tooling process. The depth for general micro structure lens 50 is about 10~400 μm, while the aspect ration of the micro structure is mostly smaller than 1. Certainly, if tooling path is variable, the extension direction of the cylindrical lens may change in different directions; as such, it is possible to fabricate cylindrical lens with meandering extension, and the advantage of such micro structure lens 50 of long, cylindrical shape with meandering distribution lies in that the irregularity of meandering can eliminate the visual problem of Moiré interference generated by regular object overlapping, which commonly occurs in overlapping an optical film with a LCD panel. Of course, based on differing design needs like distance between backlight source and module lamp, thickness of backlight mechanism and so forth, the curves used as the profile of micro structure lens 50 can be semi-elliptic, rhombic, aspheric, or of any other shape, or a micro structure formed by a combination of various structures. Different micro structures provide different diffusion angle and diffusion capability, thus in designing, better coordination and uniformity can be acquired when considered in conjunction with suitable module properties, thickness, number of lambs etc. The reason for micro structure lens 50 being of cylindrical shape lies in that the CCFL itself is similar to a point-wise light source, it accordingly requires stronger one dimensional diffusion capability to diffuse its quasi-linear light source into a plane-wise light source; in the future, it is further possible to be arranged in a form of array based on different light sources. Taking the third embodiment of the present invention for example, in the backlight using LEDs as light sources, the micro structure lens 50 may employ circular, quadrangular, hexagonal, or polygonal diffusion plates with two dimensional diffusion capability; that is, the micro structure lens 50 can be alternatively configured as a two dimensional array structure, such as in a shape of relief hemisphere, relief pyramid, relief cone. Such a two dimensional array structure can uniformly diffuse in each direction the light emitted from axially symmetric light sources like LEDs, and this two dimension-wise structure, in conjunction with the compound diffusion plate formed by the convex lens units 40, is applicable in the LED backlight module. The fourth embodiment according to the present invention can use a type of compound backlight light source in which the point-wise light source, like LED, and linear light source, e.g. CCFL, simultaneously exist. In this case, the micro structure lens 50 may be configured in a way that a one dimensional cylindrical arrangement and a two dimensional array co-exist, in conjunction with the convex lens units 40 in one dimensional distribution or two dimensional distribution, thus forming the compound diffusion plate.

From the arrow shown in FIG. 2B, it can be seen that, by passing through the reflection coating 12, the convex lens units 40, the micro diffusion particles 31, and the micro structure lens 50, light generated by the light emitting components may scatter, thus further enhancing the diffusion and uniformity in the light emitted from the light exit plane 303. In particular, the present invention uses the convex lens units 40 formed on the light entrance plane 302 of the body unit 3 to scatter in reflection of the strong and directly upward incident light that is generated by the light emitting components 20, such that the light generated by the light emitting components 20 diffuses, lowering the luminosity in brighter areas over the light emitting components 20 and allowing the luminosity in darker areas above the lamp sides to increase. Therefore, the present invention resolves from the basic, which uses the convex lens units 40 to perform first equalization of the direct light from the lamp, effectively increasing light diffusion and uniformity, thus further providing liquid crystal display with improved positive brightness and wider angle of view.

For example, the light-emitting unit 2 generates a first optical path L1 and a second optical path L2. The convex lens units 40 have a plurality of first structures 40a and second structures 40b. In addition, the first structures 40a and the second structures 40b are arranged on the light entrance plane 302, the first structures 40a are adjacent to each other, every two second structures 40b are separated from each other by a predetermined gap g, and the first structures 40a correspond to the light-emitting unit 2 (it means every group of the first structures 40a is formed over each light-emitting element 20). The micro structure lens diffusion unit 5 is arranged on the light exit plane 303. Therefore, when one part of the first optical path L1 passes through the first structures 40a, the one part of the first optical path L1 is refracted by the first structures 40a and the micro diffusion particles 31 of the body unit 3 and is transmitted to the micro structure lens diffusion unit 5 to generate divergence. Another part of the first optical path L1 is reflected by the first structures 40a to form a third optical path L3. When the third optical path L3 passes through the predetermined gap g, the third optical path L3 is refracted by the micro diffusion particles 31 of the body unit 3 and is transmitted to the micro structure lens diffusion unit 5 to generate divergence. In addition, when the second optical path L2 passes through the second structures 40b, the second optical path L2 is refracted by the second structures 40b and the micro diffusion particles 31 of the body unit 3 and is transmitted to the micro structure lens diffusion unit 5 to generate divergence.

Figure 2C:
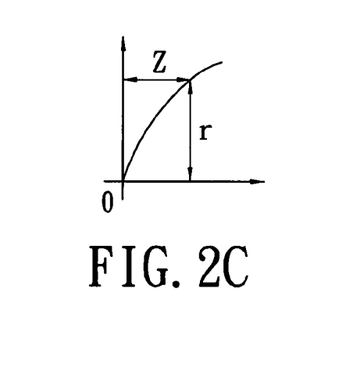
FIG. 2C shows a coordinate graph of z coefficient and r coefficient of the formula of the sag of the surface of the micro structure lens diffusion unit according to the present invention.

Moreover, referring to FIG. 2C, the formula of the sag of the surface of the micro structure lens diffusion unit is as follows:

$$z = \frac{ar^2}{1 + \sqrt{1 - a^2(b+1)r^2}} + c_1 r^4 + c_2 r^6,$$

and the number of r is aperture radius, the number of a is inverse of the radius of curvature, the numbers of $c_1, c_2, c_3, c_4$ are coefficients of different steps of r, the number of b is conic coefficient. The different values of b mean different curved surfaces, for example, when b=0, the curved surface is sphere; when b<−1, the curved surface is hyperboloid; when b=−1, the curved surface is paraboloid; when −1<b<0, the curved surface is ellipsoid.

Figure 3A:
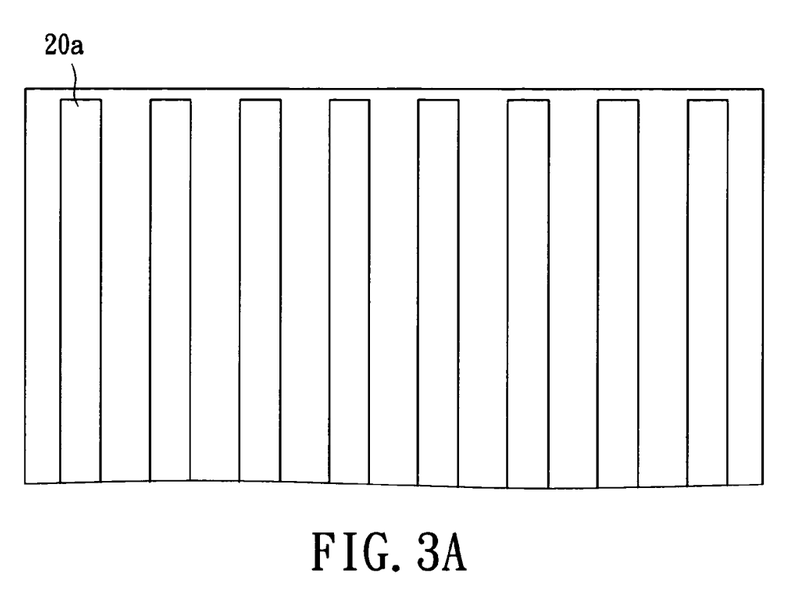
FIG. 3A shows a top view diagram of partial arrangement of a first light emitting component according to the present invention.
Figure 3B:
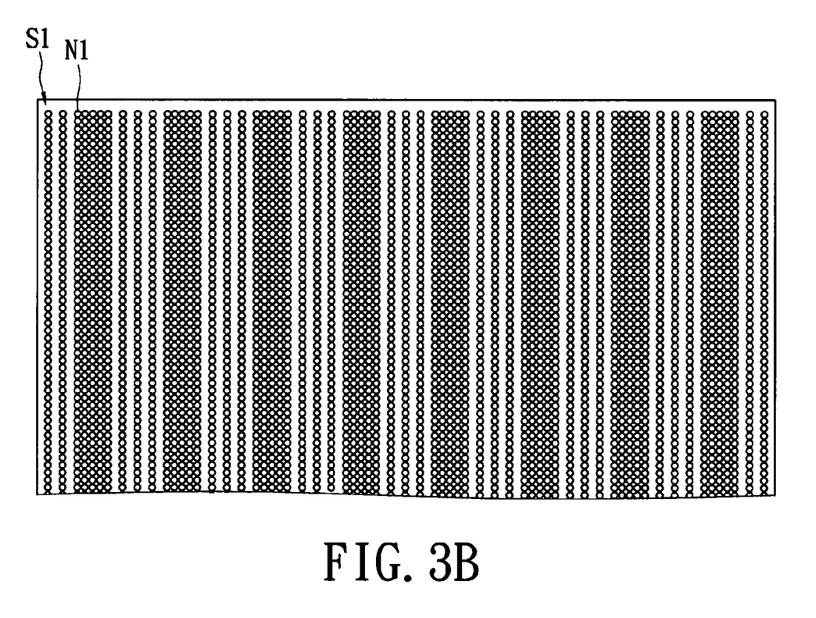
FIG. 3B shows a partial top view diagram of a first type of screen printing with various dot densities and sizes conjunctively employed in the first light emitting component according to the present invention.

Refer now to FIGS. 3A and 3B, wherein, as shown, if the plurality of light emitting components 20a used in the first and second embodiments according to the present invention are Cold Cathode Fluorescent Lamps (CCFLs), then the convex lens units 40 in the first and second embodiments may be a plurality of printing diffusion layers formed on the light entrance plane 302 of a body unit 3 by way of screen printing S1, in which the meshes N1 on the screen printing S1 have various densities and sizes. It is common that the density or size of the meshes N1 in proximity of the light emitting components 20a is more dense or bigger than the meshes N1 comparatively remote from the light emitting components 20a. In other word, the density and size of the meshes N1 are dependent of the position of the light emitting components 20a. When the ink is printed on the light entrance plane 302 of the body unit 3 through the meshes N1 of the screen printing S1 for forming the convex lens units 40 (as shown in FIG. 1B or 2B), the closer the convex lens units 40 are to the light emitting components 20a, the higher or bigger the density or size thereof will be (i.e. those meshes N1 in proximity of the light emitting components 20a are higher in density or bigger in size).

Figure 4A:
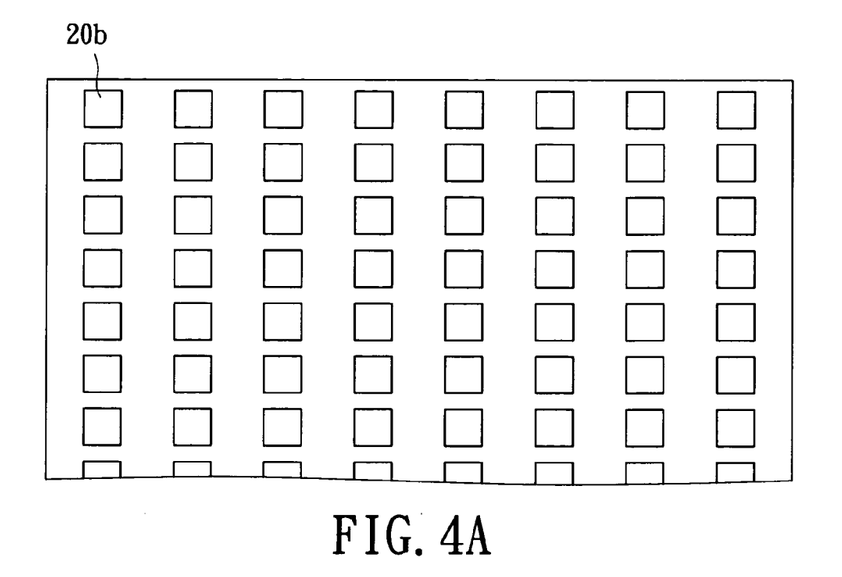
FIG. 4A shows a top view diagram of partial arrangement of a second light emitting component according to the present invention.
Figure 4B:
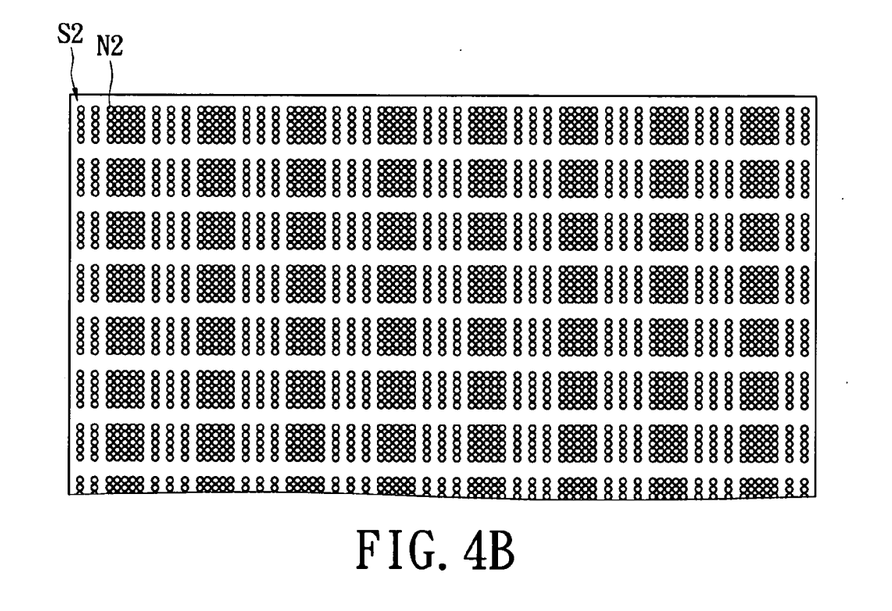
FIG. 4B shows a partial top view diagram of a second type of screen printing with various dot densities and sizes conjunctively employed in the second light emitting component according to the present invention.

Refer now to FIGS. 4A and 4B, wherein, as shown, if the plurality of light emitting components 20b used in the third embodiment according to the present invention are Light Emitting Diodes (LEDs), then the convex lens units 40 in the third embodiment may be a plurality of printing diffusion layers formed on the light entrance plane 302 of a body unit 3 by way of screen printing S2, in which the meshes N2 on the screen printing S2 have various densities and sizes, and the size and the density of the meshes N2 after printing process determines the size and the density of the convex lens units 40. The density and size of the meshes N2 in proximity of the light emitting components 20b is more dense or bigger than the meshes N2 comparatively remote from the light emitting components 20b. In other word, the density and size of the meshes N2 are dependent of the position of the light emitting components 20b. When the ink is printed on the light entrance plane 302 through the meshes N2 with various sizes and densities of the screen printing S2 for forming the convex lens units 40 (as shown in FIG. 1B or 2B), the closer the convex lens units 40 are to the light emitting components 20b, the higher or bigger the density or size thereof will be (i.e. those meshes N2 in proximity of the light emitting components 20b are higher in density or bigger in size).

Figure 5:
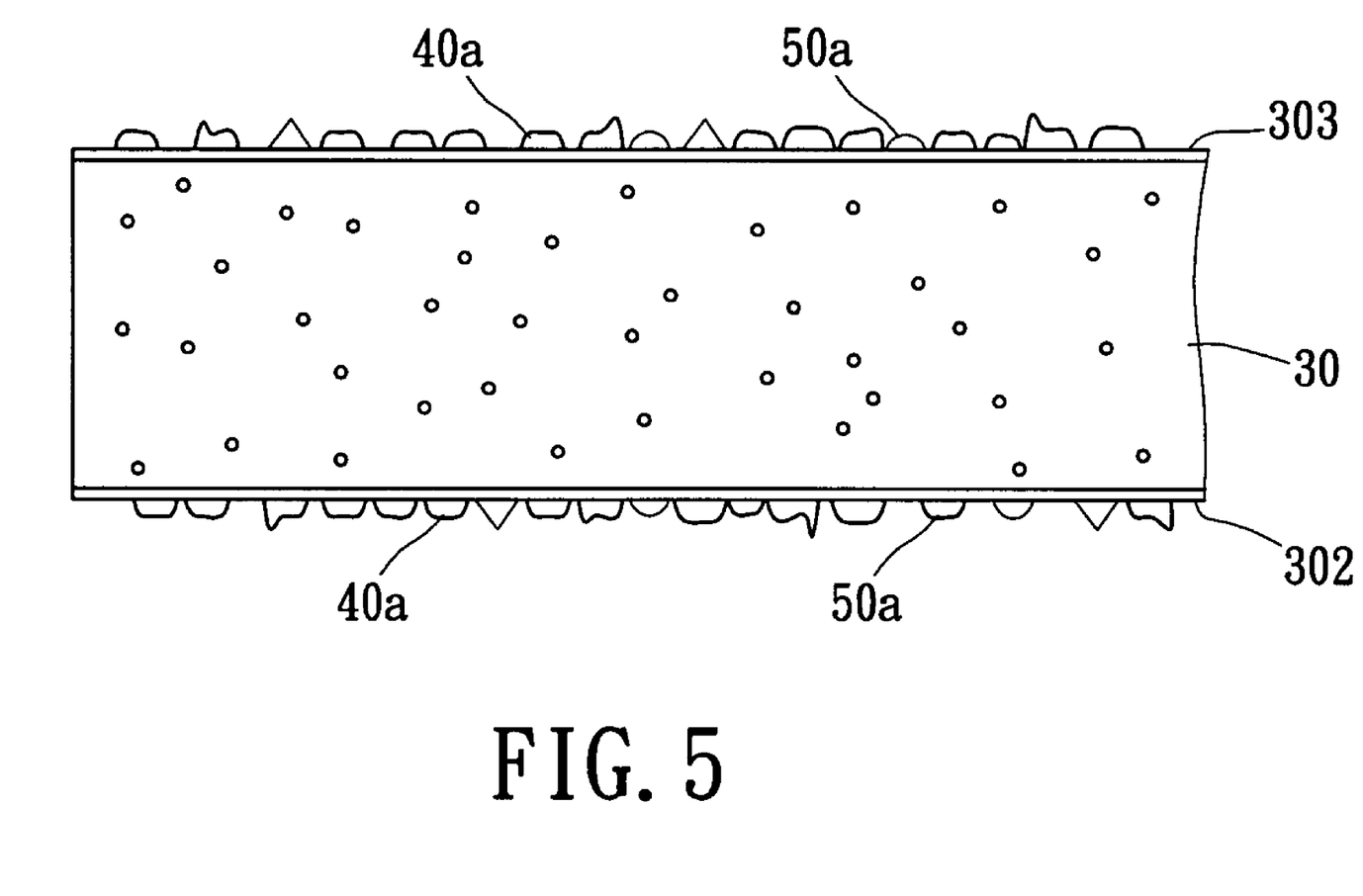
FIG. 5 shows a partial side view diagram of convex lens units and micro structure lens with various shapes, sizes and densities according to the present invention.

Refer now to FIG. 5, wherein a plurality of convex lens units 40a may also present a condition of increasing or decreasing size distribution or density distribution, which can be from greater to smaller then to greater, or from smaller to greater then back to smaller, and all of these concern about the combination of used films, distance between lamps in the backlight module, thickness of the module, and BSDF features of the reflection plate. The differences in size and interval arrangement can be optically simulated for design, and further analyzed and adjusted for optimization. Certainly, except adjustment based on density, it may be also designed as the diameter of the meshes vary in accordance with the position of the lamp, which is one of applicable optical means for adjustment. Furthermore, except that the convex lens units 40a according to the present invention may be placed on the light entrance plane 302, the convex lens units 40a can also, based on design requirement, be alternatively placed on the light exit plane 303, which can similarly achieve the effect reflection scatting diffusion, and whose integral uniform diffusion needs to be in conjunction with the shape and size of the micro structure lens 50a as well in order to acquire the result with optical simulation. Or otherwise, as shown in FIG. 5, it is possible to print on both surfaces of the light entrance plane 302 and the light exit plane 303 of the body unit 3 in the diffusion plate to screen printing the convex lens units 40a. In general, the structure of the micro structure lens 50a in the compound diffusion plate according to the present invention can be configured in accordance with the need for backlight types as a one dimensional cylindrical lens or a two dimensional lens array arrangement of any combination of hemispheric, aspheric, elliptic, parabolic or hyperbolic. The convex lens units 40 thus printed can be configured on the same side as the micro structure lens 50a or otherwise; that is, the convex lens units 40a and the micro structure lens 50a may co-exist on the light entrance plane 302 or the light exit plane 303 of the body unit 3 of the diffusion plate, and such an optical design can offer the same effect, simply differing in the order of light reflections and light paths, which may result in slight difference in overall light distribution, though high extent of diffusion effect can still be achieved.

Figure 6A:
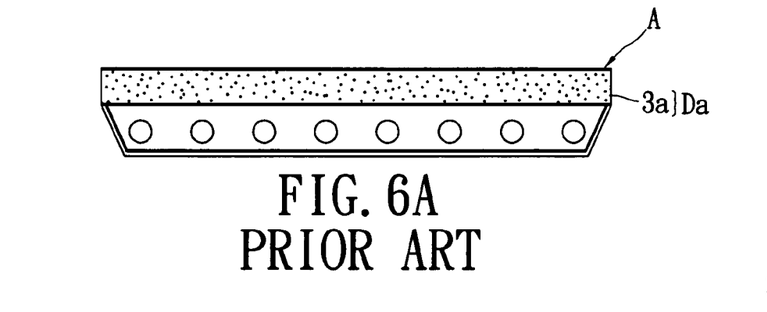
FIG. 6A shows a diagram of a prior art compound diffusion plate structure having only the body unit.
Figures 6B, 6C:
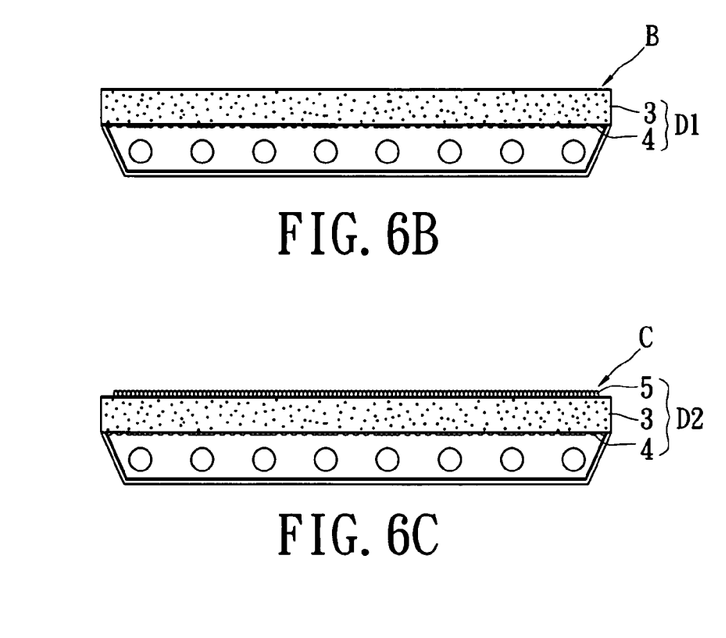
FIG. 6B shows a diagram of a compound diffusion plate structure with the body unit and the printing micro diffusion unit according to the present invention.
FIG. 6C shows a diagram of a compound diffusion plate structure with the body unit, the printing micro diffusion unit and the micro structure lens diffusion unit according to the present invention.

Refer now to FIGS. 6A to 6C, wherein FIG. 6A shows a diagram of a prior art compound diffusion plate structure Da having only the body unit 3a, FIG. 6B a diagram of a compound diffusion plate structure D1 with the body unit 3 and the printing micro diffusion unit 4 according to the present invention, and FIG. 6C a diagram of a compound diffusion plate structure D2 with the body unit 3, the printing micro diffusion unit 4 and the micro structure lens diffusion unit 5 according to the present invention.

Figure 7:
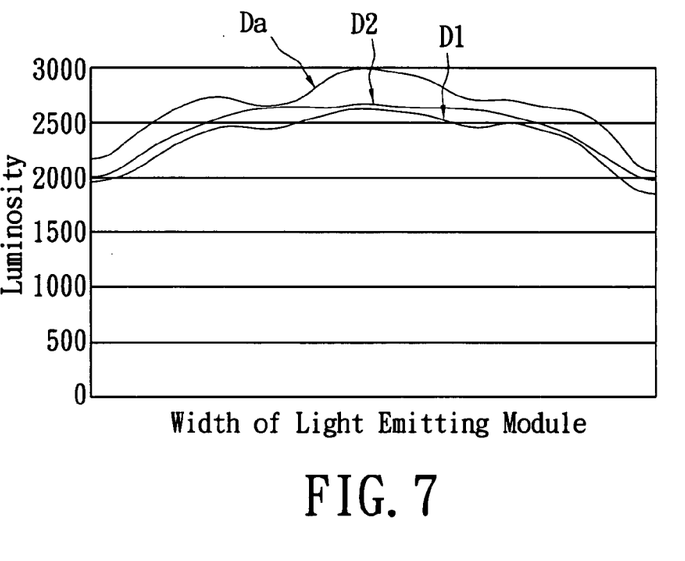
FIG. 7 shows a comparing diagram for luminosities acquired by the structures depicted in FIGS. 6A to 6C.

Refer now to FIG. 7, wherein a comparing diagram for luminosities acquired by the structures depicted in FIGS. 6A to 6C is shown. The diagram shows a luminosity distribution of a partially lateral cross-section in a commercially available novel mass-produced 32" backlight module, which module uses 12 lamps, and, compared with the conventional 32" module using 16 lamps, the number of lamps has been significantly reduced to achieve the objective of energy saving. However, relative reduction in number of lamps may increase the pitch between lamps; as a result, MURA problem is likely to aggravate. Such a structure still uses 3 diffusion films, and removal of any one of these diffusion films may cause the occurrence of MURA problem, which is considered as a premise of the present invention. The fluctuating brightness curves shown in the distribution diagram of FIG. 7 reveal that, under the condition of a coverage range of 3 lamps, using BM-7 color brightness meter manufactured by TOPCON Company as the brightness measurement instrument at one (1) degree of angle of view for measuring such a mass-produced 32" direct-light backlight module, these results highlight the differences in brightness distribution and brightness uniformity when using a conventional diffusion plate and a diffusion plate according to the present invention. In FIGS. 6A, 6B and 6C, all experimental architectures use the same diffusion plate without any diffusion films for simply comparing the difference between the diffusion plates. As can be seen, the luminosity uniformity and brightness of the compound diffusion plate structure D2 are better than the counterparts of the compound diffusion plate structure D1, and the luminosity uniformity of the compound diffusion plate structure D1 is better than the counterpart of the compound diffusion plate structure Da. As shown in FIG. 7, the use of such a compound diffusion plate offering excellent uniformity does not need to additionally place 3 diffusion films or structural brightness enhancement films after the use of diffusion plate in order to improve the uniformity thereof, as opposite to the situation found in the use of conventional diffusion plate. The single compound diffusion plate using the present invention simply employs one diffusion film which is sufficient to achieve the same effect as the convention diffusion plate can provide by using 3 diffusion films. However, since brightness achieved by using simply one diffusion plate may not be able to meet the requirement on brightness of the backlight module; thus, while adding more diffusion films can intensify brightness, if taking the aspect of brightness into consideration, it is possible to add one more diffusion film, or other brightness enhancement film, on the diffusion plate according to the present invention. In recent years, thanks to positive factors such as improvements on lamp performance and liquid crystal opening rate, lamp brightness and light transfer rate in LCD panels have been significantly enhanced, so brightness demand gradually becomes less important, while requirement in terms of uniformity is considered as being more and more crucial due to emphases on trends of energy saving and thinner form factor in thickness. The essential spirit of the present invention is to resolve the problems becoming more and more imminent and challenging for satisfying such a demand on uniformity. Therefore, the present invention can effectively reduce the cost caused by overly using additional diffusion films and also excellent uniformity in brightness can be still maintained, meanwhile, the number of used diffusion films is reduced, facilitating more convenient assembly processes for the backlight module and thus improving the yield of product assembly.

Nevertheless, the aforementioned shapes, sizes and arrangement of the convex lens units 40a are simply exemplary, not for limiting the present invention thereto.

In summary, the present invention provides the following advantages:

1. it can provide a diffusion plate with compound features, which offers functions of light source brightness maintenance, light diffusion enhancement as well as uniformity improvements in backlight module, while eliminating so-called MURA problem and offering wider angle of view for liquid crystal display;

2. on the other hand, the compound diffusion plate can operate in conjunction with light emitting unit and reflection unit to form a backlight module (and extra diffusion films or brightness enhancement film may be optionally added), in order to improve visual uniform quality outputted by the backlight module;

3. Furthermore, because that the backlight module composed of the compound diffusion plate structure, light emitting units and reflection unit can operate in conjunction with a liquid crystal display panel to provide uniform backlight source, the present invention can improve the image quality rendered on the liquid crystal display panel.

The aforementioned discussions simply illustrate detailed descriptions and appended drawings of the preferred embodiments according to the present invention, but the scope of the present invention is by no means limited thereto, nor should be used as restricting the scope of the present invention. The scope of the present invention is to be defined by the subsequent claims. All embodiments consistent with the spirit of the present invention and equivalent variations thereof should be included herein. Any changes or modifications that skilled ones in the art can conveniently consider in the field of the present invention are to be deemed as being encompassed by the scope of the present invention delineated by the claims set out hereunder.

What is claimed is:

1. A compound diffusion plate structure having a light-emitting unit generating a first optical path and a second optical path, comprising:

a body unit, which has a light entrance plane and a light exit plane;

a plurality of convex lens units having a plurality of first structures and second structures, wherein the first structures and the second structures are arranged on the light entrance plane, the first structures are adjacent to each other, every two second structures are separated from each other by a predetermined gap, and the first structures correspond to the light-emitting unit; and a micro structure lens diffusion unit arranged on the light exit plane;

wherein when one part of the first optical path passes through the first structures, the one part of the first optical path is refracted by the first structures and the body unit and is transmitted to the micro structure lens diffusion unit to generate divergence;

wherein when the second optical path passes through the second structures, the second optical path is refracted by the second structures and the body unit and is transmitted to the micro structure lens diffusion unit to generate divergence.

2. The compound diffusion plate structure according to claim 1, wherein, in addition to a main layer, the body unit further comprises at least one sub-layer respectively installed on the upper surface or lower surface of the main layer, in which the inside of the sub-layer consists of a plurality of micro diffusion particles.

3. The compound diffusion plate structure according to claim 2, wherein the plurality of micro diffusion particles are added in the body unit at a 0.001%~50% of weight ratio, and difference between the average refraction index of the plurality of micro diffusion particles and the refraction index of the material in the body unit is between ±0.02~±0.5.

4. The compound diffusion plate structure according to claim 1, wherein the plurality of micro diffusion particles are selected from a group consisting of Polymethylmethacrylate (PMMA) particles, Polycarbonate (PC) particles, Polystyrene (PS) particles or Polypropylene (PP) or Silica, Methylmethacrylate Styrenre (MS), or a mixture thereof, and the particle diameter of the plurality of transparent micro diffusion particles is between 0.1 to 30 μm.

5. The compound diffusion plate structure according to claim 1, wherein the formula of the sag of the surface of the micro structure lens diffusion unit is as follows:

$$z = \frac{ar^2}{1+\sqrt{1-a^2(b+1)r^2}} + c_1 r^4 + c_2 r^6,$$

wherein the number of r is aperture radius, the number of a is inverse of the radius of curvature, the numbers of $c_1, c_2, c_3, c_4$ are coefficients of different steps of r, the number of b is conic coefficient.

6. A backlight module, comprising:
a reflection unit, which has a reflection plate, an installation space formed by the surrounding reflection plate, and a reflection coating formed on the internal surface of the reflection plate;
a light emitting unit, which has a plurality of light emitting components installed within the installation space, wherein light-emitting unit generates a first optical path and a second optical path; and
a compound diffusion plate structure, which is installed beside the light emitting unit, wherein the compound diffusion plate structure comprises:
a body unit, which has a light entrance plane and a light exit plane;
a plurality of convex lens units having a plurality of first structures and second structures, wherein the first structures and the second structures are arranged on the light entrance plane, the first structures are adjacent to each other, every two second structures are separated from each other by a predetermined gap, and the first structures correspond to the light-emitting unit; and
a micro structure lens diffusion unit arranged on the light exit plane;
wherein when one part of the first optical path passes through the first structures, the one part of the first optical path is refracted by the first structures and the body unit and is transmitted to the micro structure lens diffusion unit to generate divergence;
wherein when the second optical path passes through the second structures, the second optical path is refracted by the second structures and the body unit and is transmitted to the micro structure lens diffusion unit to generate divergence.

7. A liquid crystal display, comprising:
a liquid crystal display panel;
a backlight module, which is installed under the liquid crystal display panel to provide the required light source for the liquid crystal display panel, wherein the backlight module comprises:
a reflection unit, which consists of a reflection plate, an installation space formed by the surrounding reflection plate, and a reflection coating formed on the internal surface of the reflection plate; and
a light emitting unit, which has a plurality of light emitting components installed within the installation space, wherein light-emitting unit generates a first optical path and a second optical path; and
a compound diffusion plate structure, which is installed beside the light emitting unit, wherein the compound diffusion plate structure comprises:
a body unit, which has a light entrance plane and a light exit plane;
a plurality of convex lens units having a plurality of first structures and second structures, wherein the first structures and the second structures are arranged on the light entrance plane, the first structures are adjacent to each other, every two second structures are separated from each other by a predetermined gap, and the first structures correspond to the light-emitting unit; and
a micro structure lens diffusion unit arranged on the light exit plane;
wherein when one part of the first optical path passes through the first structures, the one part of the first optical path is refracted by the first structures and the body unit and is transmitted to the micro structure lens diffusion unit to generate divergence;
wherein when the second optical path passes through the second structures, the second optical path is refracted by the second structures and the body unit and is transmitted to the micro structure lens diffusion unit to generate divergence.

* * * * *